United States Patent [19]

Ichihara

[11] Patent Number: 5,076,695
[45] Date of Patent: Dec. 31, 1991

[54] INTERFEROMETER

[75] Inventor: Yutaka Ichihara, Yokohama, Japan

[73] Assignee: Nikon Corporation, Yokohama, Japan

[21] Appl. No.: 486,771

[22] Filed: Mar. 1, 1990

[30] Foreign Application Priority Data

Mar. 2, 1989 [JP] Japan .................................. 1-48465

[51] Int. Cl.⁵ .............................................. G01B 9/02
[52] U.S. Cl. .............................................. 356/360
[58] Field of Search ............... 356/354, 355, 356, 359, 356/360

[56] References Cited

U.S. PATENT DOCUMENTS

| | | | |
|---|---|---|---|
| 4,575,247 | 3/1986 | Tansey | 356/359 X |
| 4,624,569 | 11/1986 | Kwon | 356/359 X |
| 4,693,604 | 9/1987 | Tenjinbayashi | 356/360 X |
| 4,744,658 | 5/1988 | Holly | 356/359 X |

Primary Examiner—Davis L. Willis
Assistant Examiner—Matthew W. Koren
Attorney, Agent, or Firm—Michael N. Meller

[57] ABSTRACT

An interferometer for measuring the spherical accuracy of a surface to be measured in accordance with the light and dark distribution condition of interference fringes produced by the interference between a measuring light beam and a reference light beam. A part of the light from a light source is projected as a measuring light beam to a surface to be measured and its reflected light beam from the surface to be measured is superimposed on a reference light beam separately derived from the source light on a two-dimensional sensor. Arranged obliquely between the light source and the surface to be measured is a flat mirror formed therethrough with a pinhole for producing a spherical wave upon the passage of the light source therethrough. A spherical wave of light diffracted and emitted from the pinhole of the mirror is used as the measuring light beam. Also, the spherical wave produced by diffraction from the pinhole is also used for the reference light beam.

9 Claims, 2 Drawing Sheets

FIG.4A   FIG.4B
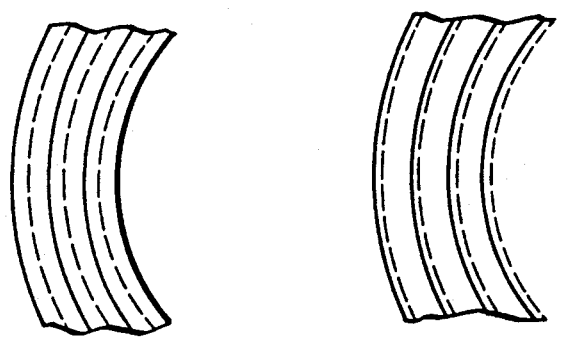
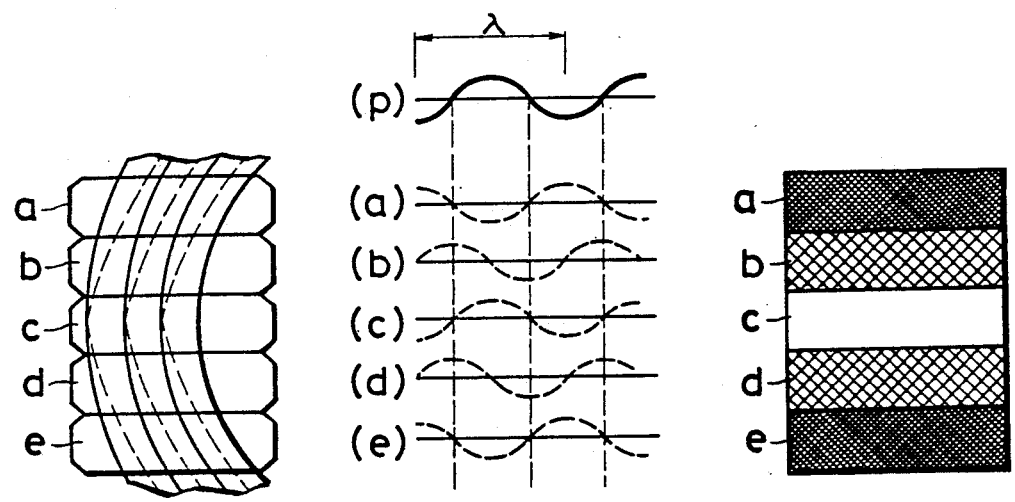
FIG.5A   FIG.5B   FIG.5C
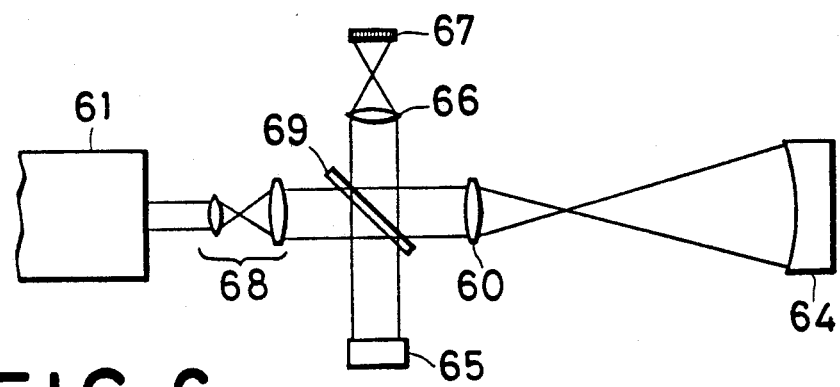
FIG.6

INTERFEROMETER

BACKGROUND OF THE INVENTION

1. Field of the Invention

The present invention relates to an interferometer and more particularly to an optical interferometer for measuring the surface accuracy of the spherical surface of an object to be measured with a very high degree of accuracy.

2. Description of the Prior Art

In the past, interferometers of the type designed to produce interference fringes by utilizing the interference of light and to analyze the interference fringes to measure the physical quantity of the surface of an object to be measured have been used for measuring the accuracy of the spherical surface of an optical element such as a lens or mirror and typical types of these interferometers include for example the Twyman-Green interferometer and the Fizeau interferometer.

For instance, the Twyman-Green interferometer is designed so that after the source light of an extremely narrow spectral range emitted from a laser has been expanded through a beam expander into parallel rays of a suitable beam cross-sectional area, the light beam is divided into two parts or directions by a beam splitter thus utilizing one of the two light beams for measuring purposes and the other light beam for reference purposes. The measuring light beam is diverged by a lens and projected as a spherical wave onto the surface to be measured (e.g., the concave spherical surface) from which the reflected light beam travels back through the same optical path as previously and converted back into parallel rays and returned to the beam splitter through the lens. The reference light beam is reflected from a reference reflecting surface (an ideal spherical surface to serve as a reference) and returned as a light beam having a wave front of a required shape to the beam splitter. The measuring light beam reflected from the spherical surface to be measured and the reference light beam converted to have the wave front of the required shape are superposed one upon another by the beam splitter and the resulting composite light beam forms an image of the light source on a two-dimensional detector through another lens. At this time, interference fringes are produced on the detector due to the difference in optical path between the two light beams. The light and dark condition of the interference frings is read by the detector and is processed by a computer, thus computing a shape error of the surface to be measured. In other words, if the surface to be measured includes any portion distorted with respect to the reference reflecting surface, the distortion is analyzed to measure a shape error of the surface to be measured which is based on the reference reflecting surface.

On the other hand, in order to improve the measuring accuracy, the reference reflelcting surface is vibrated in the direction of the optical axis by a piezoelectric element or the like and thus the apparatus is operated as an AC interferometer thereby improving the accuracy of measurement.

Also, in order to eliminate the effect of the aberration of the optical system in the optical path during the measurement of a concave or convex surface, an attempt has also been made in which a spherical surface gage (a spherical surface whose surface accuracy is known) is preliminarily set in place of a surface to be measured thereby measuring the surface accuracy and the measured value of the actually measured surface is calibrated in accordance with the measured surface accuracy. In this case, if $\lambda$ represents the wavelength of the measuring light, the absolute accuracy of the spherical surface gage itself which is used for calibricating the effect of the aberration of the optical system is on the order of $\lambda/40$ ($\lambda=633$ nm).

However, recently the surface accuracy of not greater than $\lambda/100$ to $\lambda/1000$ (several tens Å) has been required for a short wavelength optical element, particularly a soft X-ray optical element and therefore the conventional interferometers of the type using a spherical gage have had the disadvantage of being unable to meet the required accuracy.

SUMMARY OF THE INVENTION

It is the primary object of the present invention to provide an interferometer so designed that when measuring the spherical surface accuracy of an object to be measured, the surface accuracy can be measured with a very high degree of absolute accuracy without being affected by the aberration of a measuring optical system, that is, without requiring any correction by use of a spherical surface gage.

To accomplish the above object, an interferometer according to a basic aspect of the present invention comprises first optical means for directing a substantially monochromatic source light emitted from a light source as a measuring light beam along a first optical axis to a surface to be measured and for directing the resulting reflected light beam from the surface to be measured in the reverse direction along the first optical axis; second optical means for directing the source light from the light source as a reference light beam along a second optical axis which intersects the first optical axis, interference means for directing the reflected light beam from the surface to be measured to the second optical axis so as to interfere with the reference light beam and detecting means arranged on the second optical axis to detect the interference fringes between the two light beams produced by the interference means, the interferometer is particularly provided with pinhole means arranged at the intersection of the first and second optical axes to convert each of the measuring light beam and the reference light beam to a spherical wave.

In accordance with one aspect of the present invention, the interference means includes flat mirror means arranged obliquely relative to the first optical axis on the intersection between the light source and the surface to be measured, and the pinhole means includes a pinhole of a predetermined size formed through and at the posiition of the mirror means on the intersection between the first and second optical axes.

Preferably, the pinhole is provided by a small oval opening formed in the mirror in such a manner that it appears to be circular when looked from the direction of the first optical axis. The ratio between the major and minor axes of the oval shape is determined in accordance with the angle of inclination of the mirror with respect to the first optical axis, and the direction of the oval shape is such that the major axis intersects the first optical axis at the previously mentioned angle of inclination and the minor axis orthogonally intersects the first optical axis.

The size of the pinhole should preferably be selected so that when the circular opening is looked from the direction of the first optical axis, its diameter D satisfies the following relation with λ representing the wavelength of the measuring light, r the radius of curvature of the surface to be measured and a the diameter of the surface to be measured.

$$\lambda/2 < D < \lambda r/2a \quad (1)$$

If the pinhole is smaller than the lower limit of equation (1), the light quantity of the light for producing a spherical wave is decreased and therefore it is difficult to obtain an S/N ratio (signal-to-noise ratio) sufficient for detecting the surface accuracy of the surface to be measured. On the other hand, if the pinhole is greater than the upper limit of relation (1), the spherical wave produced by the pinhole is distorted thereby making it difficult to improve the measuring accuracy.

In accordance with another specific aspect of the invention, the pinhole means is designed so that a part of the source light directed along the first optical axis by the first optical means is diffracted at the previously mentioned intersection position to produce a measuring light beam in the form of a spherical wave in the direction of the first optical axis and at the same time the other part of the source light directed onto the second optical axis by the second optical means is diffracted at the intersection position thus producing a reference light beam of a spherical wave in the direction of the second optical axis. In this case, espetially the mirror means comprises a double-surface mirror arranged to form an angle of inclination of substantially λ/4 radians (45 degrees) with the first optical axis and its source-side mirror surface serves as a part of the second optical system thus causing the first and second optical axes to cross each other at the previously mentioned intersection.

In accordance with another specific aspect of the present invention, the pinhole means deffracts the source light directed along the first optical axis by the first optical means at the intersection position thus producing a spherical wave so that the first optical means directs a part of the spherical wave as a measuring light beam along the first optical axis to a surface to be measured and the second optical meanse directs the other part of the spherical wave produced by the pinhole means as a reference light beam onto the second optical axis. In this case, the mirror means is arranged so as to make with the first optical axis a greater angle of inclination (e.g., 60 degrees) than π/4 (45 degrees) and the second optical means is correspondingly arranged in such a manner that the first and second optical axes cross each other at the intersection with a smaller angle (e.g., 60 degrees) than π/2 (90 degrees).

In the interferometer according to the present invention, the source light is diffracted and converted to a spherical wave by being passed through the pinhole. Then, in accordance with the present invention the spherical wave is utilized as a measuring light beam and a reference light beam thus eliminating the need for a lens having a high degree of spherical accuracy required for projecting the measuring light beam onto the whole spherical surface to be measured and a reference mirror having a high degree of spherical accuracy required for causing the wave front of the refernce light beam to conform with the wave front of the measuring light beam. In other words, the reflected light (spherical wave) of the measuring light beam from the surface to be measured and the reference light beam forming the ideal spherical wave are caused to interfer with each other so that the light and dark distribution condition of interference fringes resulting from the interference is detected by the detecting means thereby making it possible to measure the spherical accuracy of the surface to be measured without being affected by the aberration of the measuring optical system and hence without requiring any calibration by a spherical gage.

By using the above-mentioned interferometer according to the present invention, it is possible to make the required measurement with a very high degree of absolute accuracy, e.g., λ/100 to λ/1000 by suitably selecting the size of the pinhole and the interferometer is extremely useful in cases such as when measuring the spherical accuracy of such soft X-ray optical element having a short wavelength.

The above and other object, features and advantages of the present invention will become more apparent from the following detailed description of its embodiments taken in conjunction with the accompanying drawings.

BRIEF DESCRIPTION OF THE DRAWINGS

FIGS. 4A and 4B are diagrams useful for explaining the concept of the mutual interference when a reference light beam and a measuring light beam are in the form of ideal spherical waves.

FIGS. 5A, 5B and 5C are respectively a conceptional diagram for explaining the mutual interference, a waveform diagram for explaining the phase displacements due to positions and a schematic diagram for explaining the light and dark patterns on the detecting seurface in the case of a reference light beam in the form of an ideal spherical wave and a measuring light beam in the form of a distorted spherical wave.

FIG. 6 is an optical path diagram showing schematically an example of the construction of the principal part of a conventional Twyman-Green-type interferometer.

DESCRIPTION OF THE PREFERRED EMBODIMENTS

Figure 1:
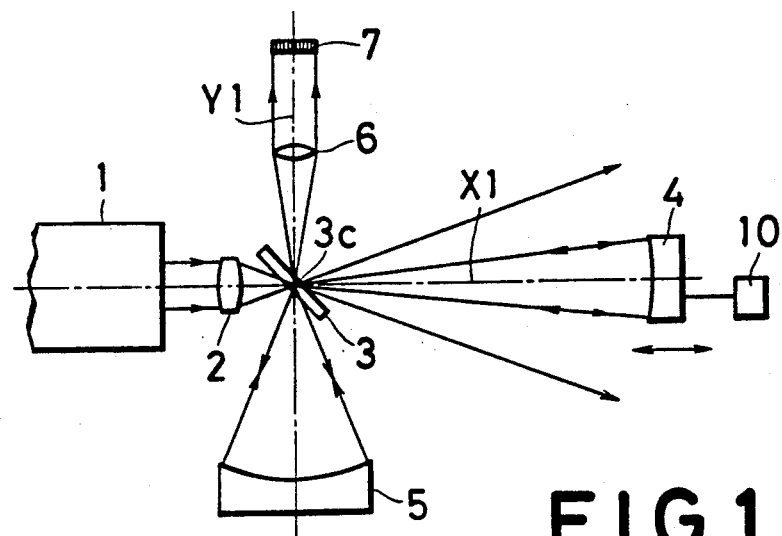
FIG. 1 is an optical path diagram showing schematically the construction of the principal part of a first embodiment of the present invention.

Prior to the description of the embodiments of the present invention, a description will be made of the measuring optical system of the ordinary Twyman-Green interferometer used in the measurement of a spherical surface to be measured, e.g., the sepherical surface of a concave mirror with reference to FIG. 6.

In the Figure, the light emitted from a laser light source 1 is spread by a beam expander 68 and then divided into two parts or directions by a beam splitter 69.

One of the two beams is spread and projected as a measuring light beam onto a surface (concave spherical surface) 64 to be measured, reflected from the surface 64 to pass back through the same optical path, converted again to parallel rays by a correction lens 60 and returned to the beam splitter 69.

The other beam divided by the beam splitter 69 is reflected by a reference mirror surface (an ideal surface serving as a reference) 65 so that it is returned as a reference light beam of a given wave front to the beam splitter 69. Then, the reference light beam and the measuring light beam reflected from the spherical surface are again superimposed so that the resulting lignt beam is passed through a lens 66 and reach a two-dimensional detector 67 thereby producing interference frings on its detecting surface. The light and dark distribution condition of the interfernce fringes is read by the detector 67 and it is then processed by a computer, thereby computing a shape error of the spherical surface 64. In other words, if the spherical surface 64 includes any deformed portion in relation to the reference mirror surface 65, a disturbance is caused in the condition of the corresponding portion of the interfernce fringes and this disturbance is analyzed thereby measuring a shape error of the spherical surface 64 on the basis of the reference mirror surface 65.

With this measuring system, in order to eliminate the effect of the aberration of the optical system in the optical path, it is necessary that the surface accuracy of a spherical gage (a surface whose surface accuracy is known) arranged in place of the surface 64 to be measured is preliminarily measured and the measured value of the surface 64 is calibrated according to the preliminarily measured result. The absolute accuracy of the spherical gage itself used for such calibration is on the order of 1/40 of the measuring wavelength $\lambda$ as mentioned previously and therefore it can no longer be considered to be an adequate accuracy for measuring the spherical accuracy of soft X-ray optical elements of short wavelengths.

Referring now to FIG. 1, there is illustrated a first embodiment of the present invention.

In an interferometer according to the first embodiment, a double-surface mirror 3 with a pinhole 3c (hereinafter referred to as a pinhole mirror) is arranged on an optical axis X1 between a laser light source 1 and a surface 4 of a concave mirror to be measured such that the mirror 3 forms an angle of about 45° with the optical axis X1 and the pinhole 3c is positioned on the optical axis X1.

Figure 3:
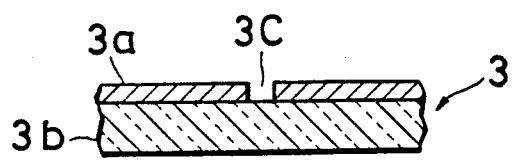
FIG. 3 is a partial enlarged sectional view of the pinhole mirror in the first embodiment.

In this embodiment, the pinhole mirror 3 is produced by vapor depositing a thin film 3a (having for example a thickness of about 1000 to 2000 Å) of chromium or the like on the surface of a flat glass plate 3b and forming the pinhole 3c in substantially the central portion of the thin film 3a by etching or the like as in FIG. 3 showing its principal part in enlarged form. The shape of the opening of the pinhole 3c is oval within the plane of the pinhole 3 and it is formed in such a manner that the major axis of the oval forms an angle of 45 with the optical axis X1 and the pinhole 3c forms a circle of a size (e.g., a circle of about 1 μm in diameter) that satisfies the previously mentioned relation (1) when looked from the direction of the optical axis X1.

Also, in the interferometer of the present embodiment a condensing concave spherical mirror 5 and a two-dimensional photoelectric sensor 7 including 100×100 CCD (charge coupled device) elements are arranged to face each other with the pinhole mirror 3 interposed therebetween along another optical axis Y1 which substantially orthogonally intersects the optical axis X1 extending from the light source 1 to the surface 4 to be measured in the portion where the pinhole 3c is formed. Numeral 6 designates a lens for converting the incident light beam to the CCD sensor 7 to parallel rays.

With the interferometer constructed as described above, the source light emitted from the laser light source 1 is condensed to a spot of beam of a suitable size by the lens 2 and it is projected on the source-side reflecting surface of the pinhole mirror 3 thereby causing a part of the spot to pass through the pinhole 3c along the optical axis X1. This source light is diffracted as it emerges from the pinhole 3c so that it is converted to an ideal spherical wave spreading around the optical axis X1 and this spherical wave is projected as a measuring light beam to the surface 4 to be measured.

The reflected light beam of the measuring light beam reflected from the surface 4 is condensed on the surface 4-side reflecting surface of the pinhole mirror 3 by following back along the same optical path. At this time, the diameter of the pinhole 3c is small enough as compared with the diameter $\lambda r/a$ of the condensed spot of the reflected light from the surface 4 so that the large part of the condensed light is reflected (bent by 90 degrees) by the surface 4-side reflecting surface of the pinhole mirror 3 and it reaches the photosensitive surface of the two-dimensional CCD sensor 7 through the lens 6.

On the other hand, the other part of the source light which has been condensed by the lens 2 and projected to the source-side reflecting surface of the pinhole mirror 3, is reflected by the source-side reflecting surface of the mirror 3, directed to the spherical mirror 5 along the other optical axis Y1, reflected by the spherical mirror 5 in the direction of the optical axis Y1 and again condensed on the source-side surface of the pinhole mirror 3. A part of this condensed light is passed through the pinhole 3c along the optical axis Y1, diffracted as it emerges from the pinhole 3c and converted to an ideal spherical wave spreading aroud the optical axis Y1 and then arrives as a reference light beam in the form of parallel rays at the photosensitive surface of the CCD sensor 7 through the lense 6.

It is to be noted that while, in the present embodiment, the light reflected by the spherical mirror 5 is converted by the pinhole 3c to a reference light beam in the form of an ideal spherical wave and therefore the spherical mirror 5 only needs to be one capable of reflecting and condensing the light beam onto the pinhole 3c and, differing from the reference mirror surface 65 of FIG. 6 showing the conventional interferometer, it is not a reference surface for making uniform the wave front of the reference light beam. Thus, the spherical mirror 5 need not be produced with a particularly high degree of accuracy.

The interference between the reference light beam of the ideal spherical wave and the reflected light from the surface to be measured (the spherical wave containing the distortion of the wave front corresponding to the surface accuracy of the surface to be measured) produces interference fringes on the photosensitive surface of the CCD sensor 7. The CCD sensor 7 outputs the light and dark distribution of the interference fringes in the form of an electic signal and this sensor output is inputted to a computer (not shown) which in turn analyzes the input to compute spherical accuracy of the surface to be measured in accordance with the light and dark distribution condition of the interference fringes.

Next, a description will be schematically made of the interference fringes produced on the photosensitive surface of the sensor 7 by the superimposition of the reference light beam of the ideal spherical wave and the reflected light from the surface to be measured which is irradiated by the measuring light beam with reference to FIGS. 4 and 5. In the Figures, the wave front of the reference light beam is indicated by the solid lines and the wave front of the reflected light beam from the surface to be measured is indicated by the broken lines.

First, where the reflected light beam of the measuring light beam from the surface to be measured and the reference light beam are both in the form of ideal spherical waves (that is, when there is no distortion in the surface to be measured), the two light beams attenuate each other thereby becoming uniformly dark on the whole if there is for example a phase difference of $\lambda/2$ between the reference light beam and the reflected light beam as shown in FIG. 4A, whereas the two light beams reinforce each other thereby becoming uniformly light on the whole if the reference light beam and the reflected light beam are in phase with each other as shown in FIG. 4B.

On the contrary, where the surface to be measured is distorted, the wave front of the reflected light beam from the surface to be measured is distorted as shown in FIG. 5A and the phase difference between the reference light beam and the reflected light beam differs depending on the position of the different regions on the photosensitive surface. For purposes of facilitating the understanding, considering the behaviours of the wave fronts of the reference light beam and the reflected light beam with respect to the plurality of divided regions a to e on the photosensitive surface of the sensor 7, the phase difference between the reference light beam and the reflected light beam of the measuring light beam from the surface to be measured varies as shown in FIG. 5B. In other words, in the regions a and e the phase of the reflected light beam is displaced by about $\lambda/2$ from the phase p of the refernce light beam and the two light beams cancel each other in each of these regions thus producing dark interfernce fringes. On the other hand, in the region c the phase of the reflected light beam substantially coincides with the phase of the reference light beam so that the two light beams reinforce each other thereby producing light interference fringes. In each of the regions b and d the reflected light beam is out of phase by about $\lambda/4$ with the reference light beam thus producing interference fringes which are intermediary in lightness between the regions a or e and c. As a result, if such interference fringes are produced on the irradiated surface orthogonally intersecting the optical axis Y1 (the surface perpendicular to the paper plane), the light and dark distribution condition of the interference fringes on the irradiated surface becomes as shown in FIG. 5C. Thus, if there is any distortion in the surface to be measured, a disturbance is caused in the light and dark distribution of the interference fringes in the corresponding region and therefore it is possible to measure the sepherical accuracy of the surface 4 to be measured by producing such light and dark patterns of interference finges as shown in FIG. 5C on the photosensitive surface of the CCD sensor 7 and detecting the variations in the light and dark patterns with the positions of the regions by the sensor 7 thereby analyzing the sensor output.

Referring again to FIG. 1 with a view to further improving the measuring accuracy, the interferometer of the present embodiment includes a piezoelectric element 10 mounted on the holder of the surface 4 to be measured so that the surface 4 is caused to make small vibrations in the optical axis direction by the piezoelectric element 10 and the surface accuracy of the surface 4 is read with a high degree of accuracy by the known procedure of the AC interferometer. Instead of mounting on the holder of the surface 4, the piezoelectric element 10 may be mounted on the holder of the spherical mirror 5. In other words, when the surface 4 to be measured or the spherical mirror 5 is caused to make small vibrations, the optical path difference is varies minutely and the condition of the interference fringes is varied correspondingly, thereby detecting the variation in each of the regions on the photosensitive surface of the sensor 7 to measure the distortion in the surface to be measured with a high degree of accuracy.

In the case of such interferometer as described above, the primary factor for causing an error is the accuracy of the size and shape of the pinhole mirror 3 and the flat accuracy of its reflecting surfaces practically presents no difficulty due to the very limited area of the reflecting surface being used for reflecting purposes. Also, while the presence of the pinhole 3c prevents the reflection of light from the corresponding portion, the pinhole diameter can be made small enough to satisfy the previously mentioned relation (1) and thereby to very greatly reduce the effect on the measuring accuracy, thus making it possible to make a measurement with a very high degree of absolute accuracy ranging from $\lambda/100$ to $\lambda/1000$.

Then, while such a case is conceived in which the pinhole 3c produces any undesired diffraction, that is, the reflected light from the surface 4 is diffracted by the pinhole 3c, projected onto the spherical mirror 5, reflected from the spherical sruface 5 and transmitted through the pinhole 3c to reach the CCD sensor 7, in any way such light is diffracted through the pinhole 3c and converted to an ideal spherical wave before reaching the CCD sensor 7 thus producing no effect on the measuring accuracy.

Figure 2:
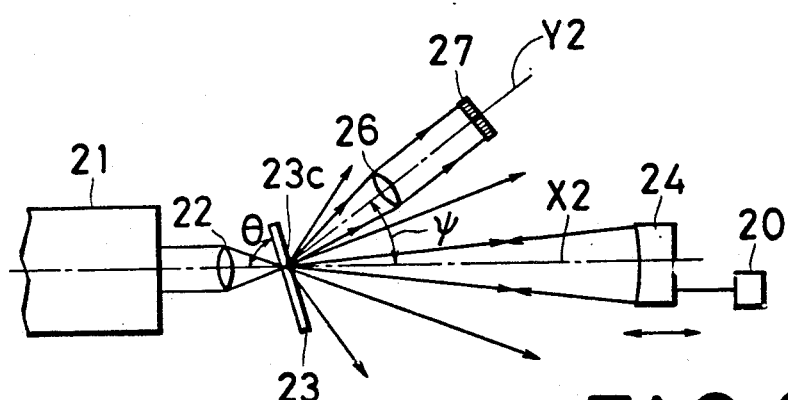
FIG. 2 is an optical path diagram showing schematically the construction of the principal part of a second embodiment of the present invention.

Referring now to FIG. 2, there is illustrated a second embodiment of the present invention. In this embodiment, arranged between a laser light source 21 and a surface 24 to be measured is a pinhole mirror 23 having a reflecting surface only on one surface thereof on the side of the surface 24 and the pinhole mirror 23 forms a given angle $\theta$ ($0 > \pi/4$ radians) with an optical axis X2. In this embodiment, no element corresponding to the spherical mirror 5 of the first embodiment is arranged and a CCD sensor 27 is arranged on another optical axis Y2 which forms a given angle $\psi$ ($\psi > \pi/2$ (radians) with the optical axis X2 extending from the light source 21 to the surface 24 to be measured. Here, ideally $\psi = \pi/2 - \theta$ (radians). Numeral 26 designates a lens for converting the light beam to be projected to the CCD sensor 27 to parallel rays.

With the interferometer constructed as described above, the light emitted from the laser light source 21 is condensed by a lens 22 and projected to the pinhole mirror 23. Thus, a part of the incident light is passed through the pinhole 23c so that it is subjected to diffraction so as optical axis X2.

A part of the spherical wave is projected as a measuring light beam to the surface 24 to be measured so that the reflected light beam from the surface 24 is condensed onto the reflecting surface of the pinhole mirror 23. The condensed reflected light beam is further reflected by the reflecting surface of the pinhole mirror 23 toward the other optical axis Y2 and then converted to parallel rays by the lens 26 to reach the photosensitive seurface of the CCD sensor 27.

Also, the other part of the ideal spherical wave which has been passed through the pinhole 3c and spread by diffraction, is directed as a reference light beam toward the optical axis Y2 and then converted to parallel rays by the lens 26 thereby reaching the CCD sensor 27. In this case, the diffracted spherical wave from the pinhole 23c tends to distort the wave front as it is departed from the optical axis X2 extending from the light source 21 to the surface 24 to be measured and also the light quantity is decreased. Thus, the optical axis Y2 or the lens 26 and the CCD sensor 27 should preferably be arranged in suitable positions in consideration of these circumstances. This also concerns with the determination of the angle of inclination θ of the pinhole mirror 23 and the shape of the oval opening of the pinhole 23c.

The reference light beam and the reflected light beam of the measuring light beam from the surface 24 interfer with each other on the photosensitive surface of the CCD sensor 27 thereby producing interference fringes. As in the case of the first embodiment, this embodiment also includes a piezoelectric element 20 mounted on the holder of the surface 24 so that variations in the interference fringes are detected by the CCD sensor 27 while causing the surface 24 to make small vibrations in the optical axis direction and the results of the detection are analyzed thereby measuring the spherical accuracy.

It is to be noted that while, in the second embodiment, the light emitted from the light source 21 and diffracted by the pinhole 23c is used as such as the reference light beam so that the path length difference between the reflected light beam of the measuring light beam and the reference light beam reaching the CCD sensor 27 becomes greater than in the case of the first embodiment, any difference in optical path length of this order presents no particular problem if a highly coherent light source, e.g., a single-wavelength laser is used for the light source 21.

While, in the first and second embodiments, the two-dimensional CCD sensor is used for detecting the light and dark condition of the interference fringes, the present invention is not limited thereto and it is of course possible to effect the detection of interference fringes by using any other photoelectric elements.

What is claimed is:

1. An interferometer comprising:
   first optical means for directing a substantially monochromatic source light emitted from a light source as a measuring light beam along a first optical axis to a surface to be measured and for directing a reflected light beam of said source light from said surface to be measured in a reverse direction along said first optical axis;
   second optical means for directing the source light from said light source as a reference light beam along a second optical axis intersecting said first optical axis;
   interference means for directing said reflected light beam from said surface to be measured along said second optical axis to interfere with said reference light beam;
   detecting means arranged on said second optical axis to detect interference fringes between said light beams produced by said interference means; and
   pinhole means for converting each of said measuring light beam and said reference light beam to a spherical wave at the intersection of said first and second optical axes.

2. An interferometer according to claim 1, wherein said interference means includes mirror means arranged obliquely relative to said first optical axis at said intersection between said light source and said surface to be measured, and wherein said pinhole means includes a pinhole of a predetermined size formed through said mirror means at a position on the intersection of said first and second optical axes.

3. An interferometer according to claim 2, wherein said pinhole comprises a small opening of oval shape formed through said mirror means in such a manner that said opening is circular in shape when looked from the direction of said first optical axis.

4. An interferometer according to claim 3, wherein the ratio between major and minor axes of the oval of said opening is determined in accordance with the angle of inclination of said mirror means formed with said first optical axis, and wherein the direction of said oval is such that said major axis intersects said first optical axis at said angle of inclination and said first optical axis at said angle of inclination and said minor axis orthogonally intersects said first optical axis.

5. An interferometer according to claim 3, wherein a diameter D of the circle of said oval opening of said pinhole when looked from the direction of said first optical axis is predetermined to satisfy the following relation $$\lambda/2 < D < \lambda r/2a \tag{1}$$

wherein λ represents the wavelength of said source light used for measurment, r represents the radius of curvature of said surface to be measured, and a represents the diameter of said surface to be measured.

6. An interferometer according to claim 2, wherein said pinhole means is such that a part of said source light directed along said first optical axis by said first optical means is diffracted at said intersection position to produce a measuring light beam in the form of a spherical wave directed toward said first optical axis, and the other part of said source light directed along said second optical axis by said second optical means is diffracted at said intersection position to produce a reference light beam in the form of a spherical wave directed toward said second optical axis.

7. An interferometer according to claim 6, wherein said mirror means comprises a double-surface mirror arranged to form an angle of inclination of substantially $\pi/4$ radians with said first optical axis, and wherein a source-side mirror surface of said mirror forms a part of said second optical means whereby said first and second optical axes orthogonally intersect each other at said intersection.

8. An interferometer according to claim 2, wherein said pinhole means diffracts said source light directed along said first optical axis by said first optical means at said intersection position to produce a spherical wave whereby said first optical means directs a part of said spherical wave as a measuring light beam along said first optical axis to said surface to be measured, and said second optical means directs the other part of said spherical wave produced by said pinhole means as a reference light beam along said second optical axis.

9. An interferometer according to claim 8, wherein said mirror means is arranged to form an angle of inclination greater than $\pi/4$ radians with said first optical axis, and wherein said second optical means is arranged correspondingly such that said first and second optical axes cross each other at said intersection at an angle not greater than $\pi/2$ radians.

* * * * *